United States Patent Office 2,803,505
Patented Aug. 20, 1957

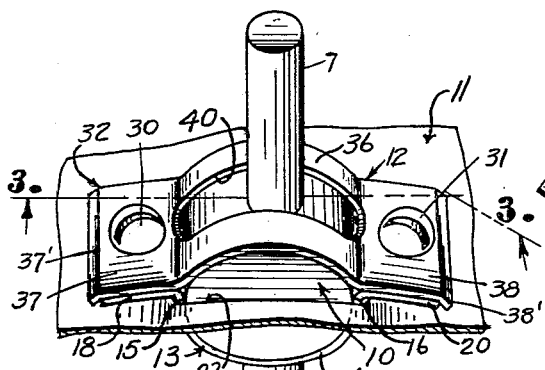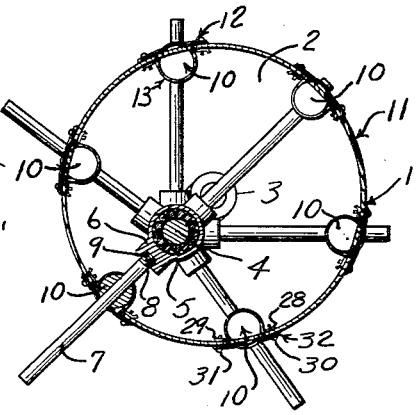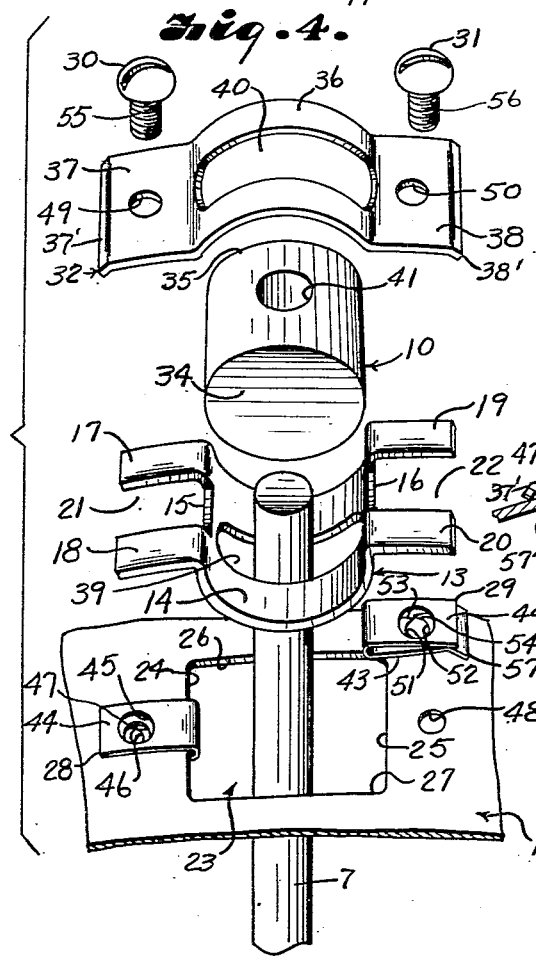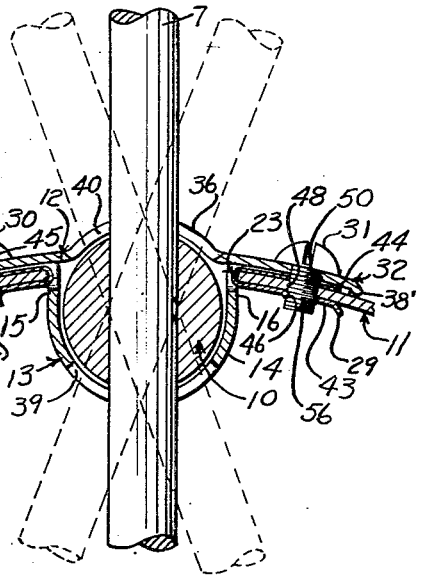
Lester E. Oberholtz, INVENTOR.

2,803,505

FINGER BEARING RETAINER FOR FEED CYLINDER

Lester E. Oberholtz, Independence, Mo., assignor, by mesne assignments, to Allis-Chalmers Manufacturing Company, a corporation of Delaware Application November 3, 1953, Serial No. 390,054

2 Claims. (Cl. 308—15)

This invention relates to a feed cylinder having projectable and retractable fingers of the type disclosed in United States Letters Patent 2,644,292, issued July 7, 1953. In devices of this character, the finger bearings wear and must be replaced, which entails a considerable job, particularly where the retainers are mounted inside the cylinder.

Therefore, the principal object of the present invention is to provide a structure whereby the guide bearings can be removed and secured exteriorly of the cylinder.

Other objects of the invention are to provide an exteriorly removable finger guide bearing retaining means, wherein the major portion thereof is contained within the cylinder; to provide a guide bearing having the exterior portion thereof closely following the outer contour of the cylinder so as to prevent catching of the grain or other material thereon, and to provide a simple and inexpensive retaining means which is securely fastened exteriorly of the cylinder.

In accomplishing these and other objects of the invention, I have provided improved structure, the preferred form of which is illustrated in the accompanying drawings wherein:

Fig. 1 is a cross section through a feed cylinder equipped with finger guide bearings and retaining means therefor constructed in accordance with the present invention, the finger at the point of the section being shown in elevation.

Fig. 2 is an enlarged fragmentary perspective view of the cylinder and of one of the fingers with the improved guide bearing retaining means.

Fig. 3 is an enlarged fragmentary cross section on the line 3—3 of Fig. 2 showing the different positions of the finger in dotted lines.

Fig. 4 is a perspective view similar to Fig. 2 but showing the guide bearing and parts of the guide bearing retaining means in disassembled spaced relation, particularly illustrating the ease of application and removal thereof exteriorly of the cylinder.

Referring more in detail to the drawings:

1 designates a feed cylinder used in feeding cut grains, hay, straw and the like as, for example, the cut grain in a harvester such as a combine or the like. Such feed cylinders usually include a drum having a cylindrical wall and closed ends 2 which are journalled on the ends 3 of a crank shaft 4. The crank shaft 4 carries a plurality of sleeves 5, each having a radial boss 6 carrying radially extending rods or fingers 7. The fingers 7 have threaded ends 8 that engage in interiorly threaded sockets 9 of the bosses so that they may be readily removed and replaced after they become worn or bent in service. The outer ends of the fingers are slidably and oscillatably mounted in bearing cylinders 10 that are carried by the cylinder wall 11 of the drum.

In operation of the feed cylinder, the fingers 7, bearing cylinders 10 and retainers therefor which will be described hereinbelow, are subject to wear and the fingers may become bent when they hit a rock or other solid obstruction. It then becomes necessary to replace the worn or damaged parts, and in order to facilitate such replacement the present invention provides a guide bearing retainer assembly, generally designated by the reference character 12 which may readily be installed on and removed from the cylinder wall of the drum, and which makes it unnecessary for an operator to reach inside the drum with his hand for the manipulation of bolts or nuts or to intercept parts that may come loose and drop into the drum during installation or removal of the bearing retainer assembly 12.

In accordance with the present invention, each of the retainer assemblies 12 includes an inner bearing support generally designated by the reference character 13, the bearing support having a substantially U-shaped body portion the bottom of which is semicylindrical and designated by the reference character 14, and parallel sides or legs of the U-shaped body portion being designated by the reference characters 15 and 16, respectively. The inner bearing support 13 further has a pair of spaced apart ear portions extending laterally outward from each leg of the U-shaped body portion at the open end of the latter, one pair of said ear portions being designated by the reference characters 17, 18 and spaced apart as indicated at 21, and the other pair of said ear portions being designated by the reference characters 19 and 20 and spaced apart as indicated at 22.

The U-shaped body portion 14, 15, 16 of the bearing support 13 is insertable into and withdrawable from a rectangular opening 23 which is formed in the cylinder wall 11 and extends through the radially inner and outer faces of the latter. The ear portions 17, 18 and 19, 20 are curved to conform with the curvature of the outer face of the cylinder wall 11, so that they lie flatly thereagainst when the bearing support 13 is suspended within the rectangular opening 23 that is formed in the wall 11 of the drum. Each opening 23 has parallel side edges 24 and 25 that extend in the lengthwise direction of the cylinder wall 11 and which are spaced apart in accordance with the leg spacing of the bearing support. The opposite parallel sides 26 and 27 of the opening extend in the circumferential direction of the cylinder wall 11 and they are spaced apart to closely accommodate the body portion of the bearing support 13 and bearing cylinder 10 as shown in Fig. 3.

Engaging portions of the cylinder wall 11 at the edges 24 and 25 and received within the spaces 21 and 22 between the ears 17, 18 and 19, 20, are fastener or spring clips 28 and 29 for screws 30 and 31 that secure the inner bearing support and retain an outer bearing support or cap 32 to carry the bearing cylinder 10 therebetween. The bearing cylinder 10 conforms in radius to the semicircular bottom portion 14 of the inner support 13 and has ends 34 and 35 engaging the end edges 26 and 27 of the opening 23 so as to prevent longitudinal displacement thereof when the fingers 7 are in operation as later to be described.

The outer support member 32 includes an arcuate central portion 36 having laterally extending flanges 37 and 38, also conforming to the curvature of the cylinder wall 11 to engage the upper faces of the ears 17, 18 and 19, 20 for clamping them to the outer face of the cylinder wall 11. The ends 37', 38' of the flanges 37, 38 are preferably formed downwardly over the outer ends of the ears to avoid any portion on which the strawlike material might collect or catch when the feed cylinder is in use. The inner and outer supports have arcuate slots 39 and 40 that conform in width to the diameter of the fingers 7 and which are of a length to accommodate the rocking motion of the fingers when the parts are in assembly as later to be described. Each bearing element 10 has a diametrical opening 41 that extends therethrough to slideably pass the fingers 7 as best shown in Fig. 3.

The fasteners 28 and 29 are preferably formed of flat spring material of a width to be snugly received in the spaces between the ears 17, 18 and 19, 20 of the bearing support and have radially inner and outer arms or gripping portions 43 and 44 substantially conforming with the length of the ears 17, 18 and 19, 20 and which are provided with aligned apertures 45 and 46 registering with apertures 47 and 48 in the wall 11 of the feed cylinder and which also register with similar apertures 49 and 50 in the flanges of the outer bearing support 32 as best shown in Fig. 4.

The inner apertures 46 of the spring clips are formed by curved ends 51 and 52 of resilient tongues 53 and 54 that are pressed from the metal of the clips so as to serve as a nut for grippingly engaging the threads 55 on the stems 56 of the screws 30 and 31 when the parts are assembled. The lower gripping portions of the clips are preferably of longer length than the outer gripping portions and terminate in angularly extending lips 57 to facilitate pushing of the clips over the edges 24 and 25 of the opening 23 in the wall of the feed cylinder.

In assembling the parts from the exterior of the feed cylinder, the threaded end of the finger 7 is passed through the opening 23 and turned into its threaded socket 9 of a sleeve 5. The inner support 13 is then moved over the outer end of the finger 7, with the finger passing through the arcuate slot 39 as shown in Fig. 4. The inner support 13 is then moved into position so that the U-shaped portion thereof is suspended within the opening 23 with the ears 17, 18 and 19, 20 laterally straddling the fastener clips 28 and 29, respectively, and engaging the outer face of the wall of the cylinder on the respective sides of the spring clips 28 and 29 which have been previously placed in position as shown in Fig. 4.

The guide bearing 10 is then applied to the finger and moved into position so that it seats within the saddle portion 14 of the inner bearing support 13. The outer support 32 is then applied with the flanges 37 and 38 radially overlapping the fastener clips 28, 29 and the ears 17, 18 and 19, 20. The screws 30 and 31 are then applied with the stems 56 thereof passing through the apertures 49 and 50 in the flanges 37 and 38, through the apertures 45 of the outer gripping portions 43 of the spring clips, through the apertures 47 and 48 of the cylinder and upon turning of the screws 30 and 31, the stems thereof are threaded into the apertures 46 formed between the tongues 53 and 54 of the inner gripping portions of the spring clips to draw the inner and outer supports in rigid assembly on the cylinder, thereby retaining the guide bearing element 10 in position for slideably and oscillatably guiding the outer end of the finger 7 when the cylinder is in operation.

When it becomes necessary to replace a guide bearing 10 or the guide bearing supports, the parts are readily removed from the exterior of the feed cylinder. The screws 30 and 31 are first removed to permit removal of the outer bearing member. The guide bearing 10 may then be withdrawn from the saddle portion 14 of the inner bearing support 13 and replaced with a new part.

If the inner bearing support 13 is worn, it is readily withdrawn from the outer end of the bearing finger and a new bearing support 13 may be inserted in position within the opening 23 of the cylinder as above described, followed by the guide bearing 10 and outer support or cap 32, after which the screws 30 and 31 are applied to retain the parts in assembly.

From the foregoing it is obvious that I have provided a bearing guide for the fingers of a feed cylinder which bearing guide or the supporting parts thereof may be readily applied and removed from the exterior of the cylinder thereby eliminating the necessity of dismantling the cylinder as is required in the case of the bearing supports disclosed in the above mentioned patent.

What I claim and desire to secure by Letters Patent is:

1. In a device of the character described, the combination of a cylinder wall having an opening extending through radially inner and outer faces thereof, a pair of fastener clips straddling portions of said cylinder wall adjacent relatively opposed edge portions, respectively, of said opening; each of said fastener clips having aligned openings in radially inner and outer arm portions thereof, and said cylinder wall having a pair of apertures in registry, respectively, with said openings of said fastener clips; a bearing support having a substantially U-shaped body portion and a pair of spaced apart ear portions extending laterally outward from each leg of said U-shaped body portion at the open end of the latter; said U-shaped body portion having a bottom slot and being insertable into and withdrawable from said cylinder wall opening, and said ear portions bearing upon said outer face of said cylinder wall in laterally straddling relation to said fastener clips; a bearing element rotatably seated within said U-shaped body portion of said bearing support and having an aperture in registry with said bottom slot for guiding a reciprocable rod element therethrough and through said cylinder wall opening; a bearing cap having an arcuate central portion engaging said bearing element and having laterally extending flanges radially overlapping said fastener clips and ears, and fastening screws extending through said flanges of said bearing cap, through said radially outer arm portions of said fastener clips and through said cylinder wall apertures into threaded engagement with said radially inner arm portions, respectively, of said fastener clips for retaining said bearing support, bearing element and cap in assembly.

2. The combination set forth in claim 1, wherein said U-shaped body portion of said bearing support and said bearing element are relatively proportioned so that the major portion of said bearing element will be contained within said U-shaped body portion at the radially inner side of said cylinder wall.

References Cited in the file of this patent

UNITED STATES PATENTS

| | | |
|---|---|---|
| 496,482 | Kailor | May 2, 1893 |
| 2,378,258 | Tinnerman | June 12, 1945 |
| 2,580,119 | Meyers | Dec. 25, 1951 |
| 2,633,231 | Pilcher | Mar. 31, 1953 |
| 2,644,284 | Oberholtz et al. | July 7, 1953 |
| 2,644,292 | Oberholtz et al. | July 7, 1953 |
| 2,672,905 | Hartman et al. | Mar. 23, 1954 |